(12) United States Patent
Engstrand

(10) Patent No.: US 7,817,632 B2
(45) Date of Patent: Oct. 19, 2010

(54) ACCESS CONTROL FOR MULTICAST CHANNEL REQUEST

(75) Inventor: Rolf Engstrand, Skarholmen (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 762 days.

(21) Appl. No.: 10/597,334

(22) PCT Filed: Jan. 22, 2004

(86) PCT No.: PCT/SE2004/000073

§ 371 (c)(1),
(2), (4) Date: Feb. 21, 2007

(87) PCT Pub. No.: WO2005/071903

PCT Pub. Date: Aug. 4, 2005

(65) Prior Publication Data

US 2007/0263625 A1    Nov. 15, 2007

(51) Int. Cl.
*H04L 12/28* (2006.01)
(52) U.S. Cl. ...................................... 370/390; 370/236
(58) Field of Classification Search ................. 370/390, 370/236, 400; 348/14.08
See application file for complete search history.

(56) References Cited

U.S. PATENT DOCUMENTS

| | | | |
|---|---|---|---|
| 6,434,117 B1 * | 8/2002 | Momona | 370/236 |
| 6,578,076 B1 | 6/2003 | Putzolu | |
| 2003/0043840 A1 | 3/2003 | Kurokawa et al. | |
| 2003/0181165 A1 | 9/2003 | Sugar et al. | |
| 2003/0231588 A1 | 12/2003 | Roth et al. | |
| 2004/0181811 A1 * | 9/2004 | Rakib | 725/122 |
| 2006/0013247 A1 * | 1/2006 | Koch et al. | 370/437 |
| 2006/0038877 A1 * | 2/2006 | Richardson et al. | 348/14.08 |

* cited by examiner

*Primary Examiner*—Dang T Ton
*Assistant Examiner*—Wei Zhao

(57) ABSTRACT

The present invention relates to methods and arrangements for access control in a multicast system when data is distributed from a source VS on a common link L3 to at least two users U1-U12 via a node BN21 that comprises a request arbiter ARB21. The arbiter is arranged to distribute the data from source to the users. The method comprises the following steps: —A weight is assigned to each user U1-U12 associated with the node BN21. The weights determine each user's allowed bandwidth i.e. bandwidth allowed to use out of available bandwidth on the common link L3. —A request to join a multicast session $S_{81}$ is received to the node BN21 from a user U1. —Actual bandwidth usage by the user U1 calculated as the sum of the user's bandwidth part of each used session on the common link L3 including the new request, is compared in the node BN21 with the users U1 allowed bandwidth. —The request denied if the available bandwidth is lower than the actual bandwidth.

8 Claims, 5 Drawing Sheets

| S | U |
|---|---|
| U1 | S1,S2,S51 |
| U2 | S2,S71,S161 |
| U3 | S2,S171,S133 |
| U4 | S3,S181 |
| U5 | S2,S131 |
| U6 | S2,S41 |
| U7 | S2,S191,S120 |
| U8 | S2,S81,S131 |
| U9 | S2,S41,S133 |
| U10 | S61,S121,S42 |
| U11 | S2,S51,S61 |
| U12 | S51,S61,S81 |

ACCESS CONTROL FOR MULTICAST CHANNEL REQUEST

TECHNICAL FIELD OF THE INVENTION

The present invention relates to methods and arrangements for access control in a multicast system when data is distributed from a source to at least two users.

DESCRIPTION OF RELATED ART

It is possible to send video over packet networks such as IP- and Ethernet networks. Since the packet stream needed to produce the moving pictures on the TV screen has considerable bandwidth, many networks do not have sufficient total bandwidth to provide for unique video data streams to each user. For TV programs viewed by several users (recipients), it is sufficient to send one packet stream from the source, and duplicate this stream only at points in the network where there is more than one output port, which leads to a viewer. According to this scheme, any link between a recipient and the source carries exactly one copy of the packet stream. A link that is not between the source and a recipient does not carry the packet stream. This technique is called multicast. Multicast is a valuable way of saving bandwidth when data is to be sent to several recipients at the same time.

In some multicast systems, control of which links the packet stream is copied to rests with the recipients. Data streams are addressed to rather abstract destination addresses. These addresses do not represent static sets of destinations. They are identification tags, which the users and the network use when negotiating about where streams are to be copied. These addresses are called multicast addresses. According to some protocols for negotiating about multicast streams, sources send packets addressed with multicast addresses into the network. Other nodes become recipients of the multicast stream by requesting to be so. IGMP is a protocol for hosts on IP networks to negotiate with Ethernet switches over which multicast streams they are to receive. In some networks there are regions, which do not have sufficient resources to transfer all multicast streams, which nodes might request. This is reasonable since multicast is about handling large data streams. Or, put another way, if there was sufficient bandwidth for all data streams everywhere, there would not be a need for multicast. The hope of the builders of such networks is that requests will be sufficiently congruent (nodes near each other request the same multicast streams to some extent) for the users to be sufficiently satisfied. The resources that may be limited include total bandwidth and total number of streams.

For the case when the network is not able to fulfill all requests for multicast streams there is need for an arbiter or resource disperser. A packet transmission apparatus is disclosed in the patent US 2003/0043840. A packet arbiter selects packets by a prescribed algorithm and requests transmission of the packet. The US patent describes a rather static system where current need are not taken into consideration and where fairness is set aside. Since the load on a network is dependent on congruence of requests, the techniques used for resource allocation in the unicast case cannot be applied directly. In the unicast case, the load on the network can be calculated by adding the loads caused by individual users. In the multicast case, requesting a new stream adds the new stream to the load, while requesting a stream already being streamed to another user connected to the same network node adds little or nothing to the load on this node. Therefore the methods for limiting resource utilisation for unicast users cannot be applied to multicast users with reasonable efficiency. Bandwidth limits sufficiently low to ensure that the system is not overloaded would result in severe underutilization of the network resources.

SUMMARY OF THE INVENTION

The present invention solves problems related to resource conflicts in a multicast system. The problems are solved by the invention by limiting accessibility of bandwidth to users before resource conflicts occur.

More in detail the problems are solved by the invention by a method for access control in the multicast system when data is distributed from a source to users on a common link via a node. The node comprises a request arbiter arranged to select data from the source to the users. The method comprises the following steps:

Assigning a weight to each user associated with the node, which weights determine each user's allowed bandwidth i.e. bandwidth allowed to use out of available bandwidth on the common link.

Receiving a request to join a multicast session, from a user to the node.

Comparing in the node, actual bandwidth usage by the user calculated as the sum of the user's bandwidth part of each used session on the common link including the new request, with the users allowed bandwidth.

An advantage of the invention is that denial of access affects heavy users as a limitation of how much multicast information they get access to rather than affecting users who are trying to go from no information to some information. This means a higher probability of success for users who are trying to get their first channel at the cost of users getting a lower probability of viewing many channels.

Another advantage is that a higher number of channels are made available for those who view channels, which are also viewed by others. Thus, the ability to load the distribution network is evened out. Users get more equal opportunities. Or rather, the operator gets control over the opportunities the viewers get to load the network.

The invention will now be described more in detail with the aid of preferred embodiments in connection with the enclosed drawings.

BRIEF DESCRIPTION OF THE DRAWINGS

FIG. 2 discloses a table in which users subscribing to different sessions are shown.

DETAILED DESCRIPTION OF EMBODIMENTS

Figure 1:
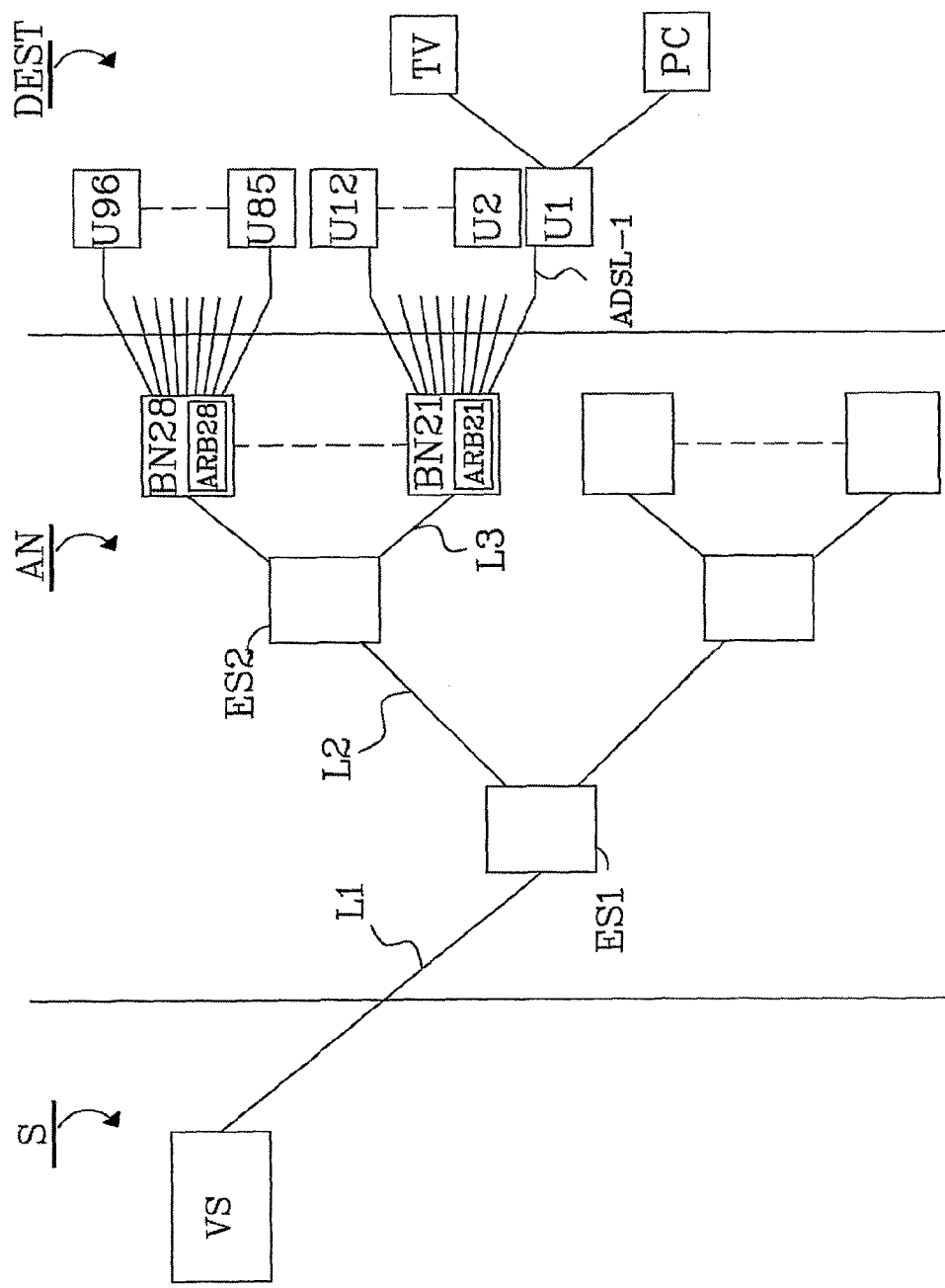
FIG. 1 shows a block schematic illustration of a multicast communication system used to transfer data from a video source via a request arbiter to users at a destination.

In FIG. 1 a multicast transmission system for video transfer is disclosed in a first embodiment. The transmission system transmits and distributes video sequences from a video source VS to several users U1-U96. The users, that are receivers or local distributors of video sequences, are symbolized with boxes in FIG. 1 but for the sake of clarity of FIG. 1, only the users U1, U2, U12, U85 and U96 are shown in the figure. The multicast system comprises a source network part S, an access network part AN, and a destination network part DEST. The access network AN, is a packet transmission network that can be of the type connection oriented or connectionless. The source is in this example a video source VS and the destination consists of different users U1-U96 located in for example offices or homes. In this example ninety-six users divided into groups of twelve are connected to different branch nodes BN21-BN28 in the access network, i.e. twelve users are connected to each branch node. The access network AN comprises Ethernet switches ES1 and ES2 that distribute data between the source VS and the branch nodes BN21-BN28. A first link L1 connects the video source VS to the Ethernet switch ES1, a second link L2 connects the Ethernet switch ES1 to the Ethernet switch ES2 and a third link L3 connects the Ethernet switch ES2 to a branch node BN21. 200 video sessions are available from the video server VS. The third link L3, which also is called a common branch node link L3 is a 100 Mbit/s link. The branch node BN21 is a MUX-unit that distributes data arriving at the node to the users U1-U12, via 8 Mbit/s ADSL-links. The user U1 is a distributor in a home to which a TV and a PC are connected. The branch node BN21 comprises a request arbiter ARB. The arbiter considers all currently granted bandwidth requests, the contracted conditions for all users U1-U12 and available resources. From these facts the arbiter determines for each request whether it should be granted or not. This will be further explained below.

According to the invention, each user is assigned a weight to determine how much multicast bandwidth each user is to be allowed to receive. The weight is assigned when the system is configured. Bandwidth availability is hereby proportional to weight assigned. The weight assigned is translated into the bandwidth available to the user, i.e. the allowed bandwidth, by using a conversion factor that decreases with actual load on the third link L3.

A user's actual bandwidth on a link is calculated as the sum of the users share in all the sessions subscribed to. If the user is subscribing to sessions $S_1, S_2 \ldots S_m$, the number of subscribers to these sessions is $n_1, n_2 \ldots n_m$, and the bandwidths are $b_1, b_2 \ldots b_m$, respectively. The users actual bandwidth is the sum of $b_i/n_i$ for all those sessions.

FIG. 2 discloses a table of users U1-U12 in relation to subscribed sessions on the third link L3 out of the two hundred sessions $S_1$-$S_{200}$. As already said, the third link is a 100 Mbit/s link. In this example a bandwidth of 50 Mbit/s is reserved for the subscribed sessions. In FIG. 2 it can be seen that U1 has subscribed to sessions $S_1, S_2, S_{51}$ and that U6 subscribes to sessions $S_2, S_{41}$ In this example each subscribed session requires 1.5 Mbit/s out of the reserved 50 Mbit/s bandwidth on the link L3. In FIG. 2 it can be seen that seventeen different sessions occupy the third link L3 and consequently 50−17×1.5=24.5 Mbit/s remains available on the third link. This is the so-called available bandwidth.

A method according to the invention will now be explained. The method comprises the following steps:

When the system is configured each user is assigned a weight. The weight settles the importance of the user. In this example, the users U2-U6 have been assigned the weight "1", U7-U12 are assigned the weight "2", U13-U18 are assigned the weight "3" and U19-U24 have been assigned the weight "4". The user U1 has been assigned the weight "3". The weight "1" means in this example that the user is allowed to use 20% of the third link's L3 remaining bandwidth, "2" means 15%, "3" means 10% and "4" means 5%.

A request to join a session is received to the branch node BN from the user U1. U1 requests to join the session $S_{81}$.

The arbiter ARB21 starts to determine U1's actual bandwidth. As can be seen in FIG. 2, U1 is already part of the sessions $S_1, S_2$ and $S_{51}$. U1 alone uses the session $S_1$ while U1 shares $S_2$ with eight other users and $S_{51}$ with two other users. Session $S_{81}$ is before U1's request already shared by two other users U8 and U12. As said, each session requires 1.5 Mbit/s bandwidth and U1's actual bandwidth is hereby calculated as the sum of U1's bandwidth part of each used session, including the new request, i.e.

$$\frac{b_1}{n_1} + \frac{b_2}{n_2} + \frac{b_{51}}{n_{51}} = \frac{1,5}{1} + \frac{1,5}{9} + \frac{1,5}{3} = 2,167 \; Mbit/s$$

plus the bandwidth part of the new requested session $S_{81}$, which is $$\frac{b_{81}}{n_{81}} = \frac{1,5}{3} = 0,5 \; Mbit/s.$$

U1's actual bandwidth is hereby 2,167+0.5=2,667 Mbit/s.

The arbiter determines available bandwidth. In FIG. 2 it can be seen that seventeen sessions are reserved on the third link L3. This means that a bandwidth of 50−17×1.5 Mbit/s is available on the third link L3, i.e. 24.5 Mbit/s is available.

The arbiter determines bandwidth available to U1, i.e. the allowed bandwidth. The allowed bandwidth is calculated as available bandwidth on the link L3 in relation to U1's weight. The weight determines what relative share of the bandwidth reserved for this kind of sessions the user is entitled to. The bandwidth made available to the user is hereby proportional to the weight assigned to the user. In this example, U1's weight is "3" i.e. U1 is allowed to use 10% of the available bandwidth. U1's allowed bandwidth is hereby 0.1×24.5=2.45 Mbit/s.

The arbiter compares U1's actual bandwidth 2,667 Mbit/s with U1's allowed bandwidth 2.45 Mbit/s and finds that allowed bandwidth is lower than actual bandwidth.

The arbiter denies the request from U1.

Different scenarios will now be conceived to highlight the advantages of the invention. For example:

Assuming that available bandwidth on the third link L3 is more than the 24.5 Mbit/s i.e. that less users have subscribed to the sessions. Let's assume that the available bandwidth is 30 Mbit/s. U1's weight is "3" i.e. U1 is allowed to use 10%. This in turn will lead to a situation where the arbiter compares U1's actual bandwidth 2,667 Mbit/s with U1's allowed bandwidth 3.0 Mbit/s and finds that allowed bandwidth is higher than actual bandwidth. Consequently the arbiter will allow the request from U1.

Again returning to the original example and assuming that U1 has been weighted as a more important user and instead of weight "3" have got weight "2" i.e. U1 is allowed to use 15%. This will lead to a situation where U1's allowed bandwidth is 0.15×24=3.6 Mbit/s. This in turn will lead to a situation where the arbiter compares U1's actual bandwidth 2,667 Mbit/s with U1's allowed bandwidth 3.6 Mbit/s and finds that allowed bandwidth is higher than actual bandwidth. Consequently the arbiter will allow the request from U1.

Again returning to the original example and assuming that U1 for the first time requests to join a session. In this case U1's actual bandwidth will be $$\frac{1,5}{3} = 0,5 \ Mbit/s$$

instead of the earlier 2.167+0.5=2.667 Mbit/s. This in turn will lead to a situation where the arbiter compares U1's actual bandwidth 0.5 Mbit/s with U1's allowed bandwidth 2.45 Mbit/s and finds that actual bandwidth is lower than allowed bandwidth. Consequently the arbiter will allow the request from U1.

Again returning to the original example and assuming that U1 is the first subscriber requesting to join the session $S_{81}$. In this case U1's actual bandwidth will be $$2,167 + \frac{1,5}{1} = 3,667 \ Mbit/s.$$

Compare if U1 instead was the tenth user to join the session $S_{81}$. In this case U1's actual bandwidth would be $$2,167 + \frac{1,5}{10} = 2,317 \ Mbit/s.$$

When comparing the two scenarios it can be seen that the arbiter will allow the request when U1 is number ten but deny the request if U1 is number one.

Let's assume that the requested session $S_{81}$ was already used by someone ells. This is actually the case with the requested session $S_{81}$ in the above first embodiment. In this case the new request will not imply any additional load and the user U1 may be allowed to use the session even if not actually justified. The method according to this variation of the first embodiment will enable this, and comprises the following further steps after the arbiter has compared U1's actual bandwidth 2,667 Mbit/s with U1's allowed bandwidth 2.45 Mbit/s (compare the method in the first embodiment):

The arbiter ARB21 finds out that the requested session $S_{81}$ already is used by at least one other user U8,U12. This information is stored in a memory in the arbiter ARB21.

The arbiter allows the request from U1.

Now again returning to the first embodiment. Let's assume, as yet another variation of the first embodiment that the user wants to return back to session $S_{81}$ after for example a short TV-commercial break. The user is hereby seen as subscribing to the session also for some time after the actual subscription has ended. For a period of time after the actual subscription has ended, the user is guaranteed to be able to "come back". The operator sets a so-called qualification time that defines "short". If the user would not be allowed to return after a short commercial break it would cause dissatisfaction. The method according to this variation of the first embodiment comprises the following further steps after the arbiter has compared U1's actual bandwidth 2,667 Mbit/s with U1's allowed bandwidth 2.45 Mbit/s (see the method in the first embodiment):

The arbiter ARB21 finds that the user U1 used the session $S_{81}$ a time ago that is less than the predefined qualification time. This information is stored in a memory in the arbiter ARB21.

The user's weight is temporarily changed from "3" to "2", i.e. the user has become a more important user.

The arbiter allows the request from U1.

When the user later leaves the session, the user's weight will again be changed back to "3".

In order to prevent that quick browsing through sessions accumulate extra subscriptions that cause the arbiter to deny subscriptions, there is a need to filter out very short actual subscriptions. The operator hereby defines a so-called guarantee time that defines the time a user must stay at a session in order to later be allowed to come back to the session. This means a variation of the method above whereby the arbiter also checks the guarantee time after having checked the qualification time. The weight will hereby be changed from "3" to "2" only if the user actually used the session a time ago that is less than the predefined qualification time and if the user at that time used the session during a time period that exceeds the predefined guarantee time.

Figure 3:
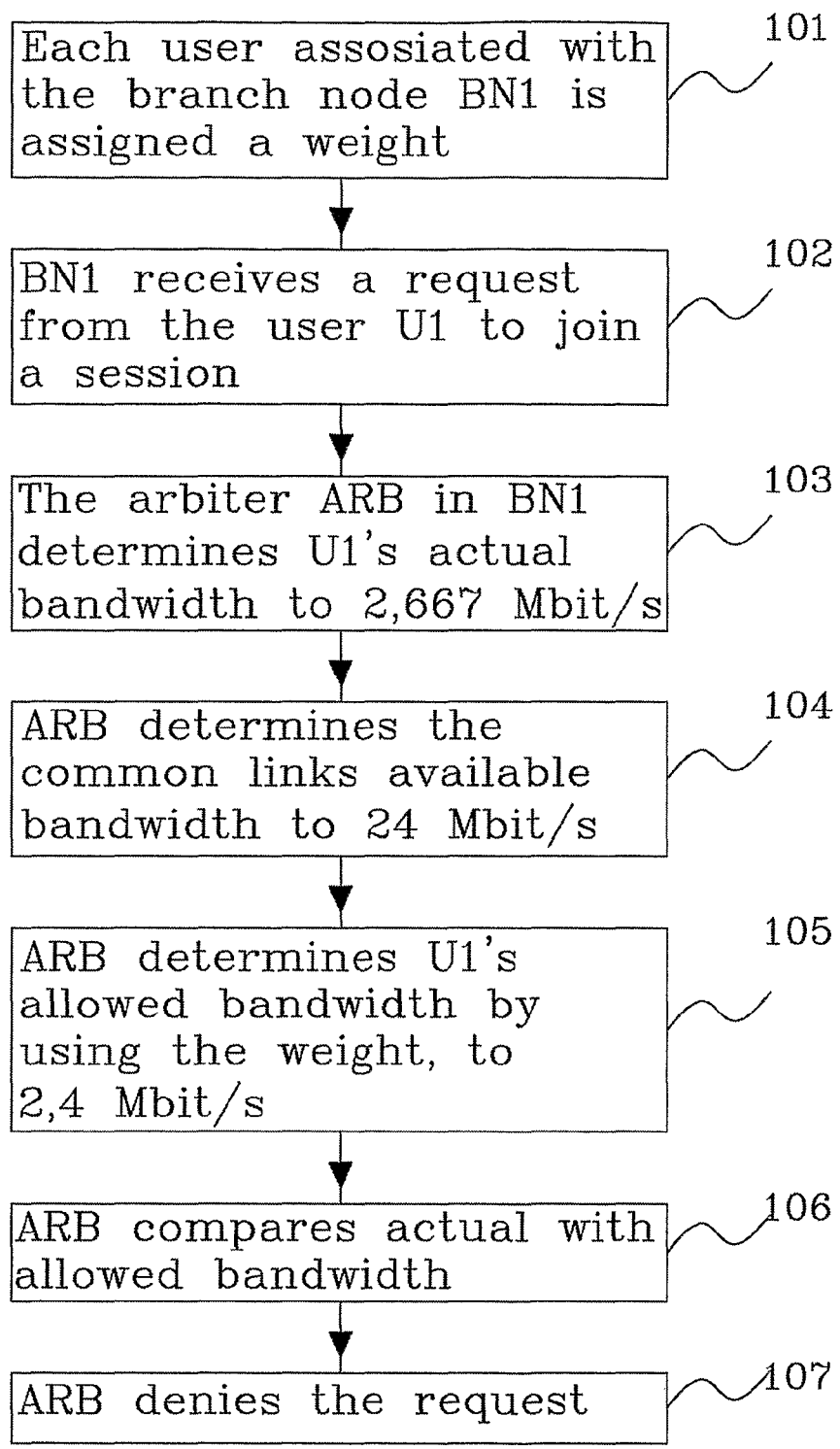
FIG. 3 discloses a flowchart illustrating a method to prevent resource conflicts in a multicast system.

In FIG. 3 the most essential steps of the method can be seen. The flow chart is to be read together with the earlier shown figures. The method according to the invention comprises the following steps:

When the system is configured each user is assigned a weight. The user U1 has been assigned the weight "3". This step can be seen in the flow chart by a block 101.

A request to join a session is received to the branch node BN from the user U1. U1 requests to join the session $S_{81}$. This step can be seen in the flow chart by a block 102.

The arbiter ARB21 determines U1's actual bandwidth. U1's actual bandwidth is hereby 2,167+0.5=2,667 Mbit/s. This step can be seen in the flow chart by a block 103.

The arbiter determines available bandwidth on the third link L3. A bandwidth of 50−17×1.5 Mbit/s is available, i.e. 24.5 Mbit/s is available. This step can be seen in the flow chart by a block 104.

The arbiter determines U1's allowed bandwidth. U1's allowed bandwidth is 0.1×24.5=2.45 Mbit/s. This step can be seen in the flow chart by a block 105.

The arbiter compares U1's actual bandwidth 2,667 Mbit/s with U1's allowed bandwidth 2.45 Mbit/s and finds that allowed bandwidth is lower than actual bandwidth. This step can be seen in the flow chart by a block 106.

The arbiter denies the request from U1. This step can be seen in the flow chart by a block 107.

Figure 4:
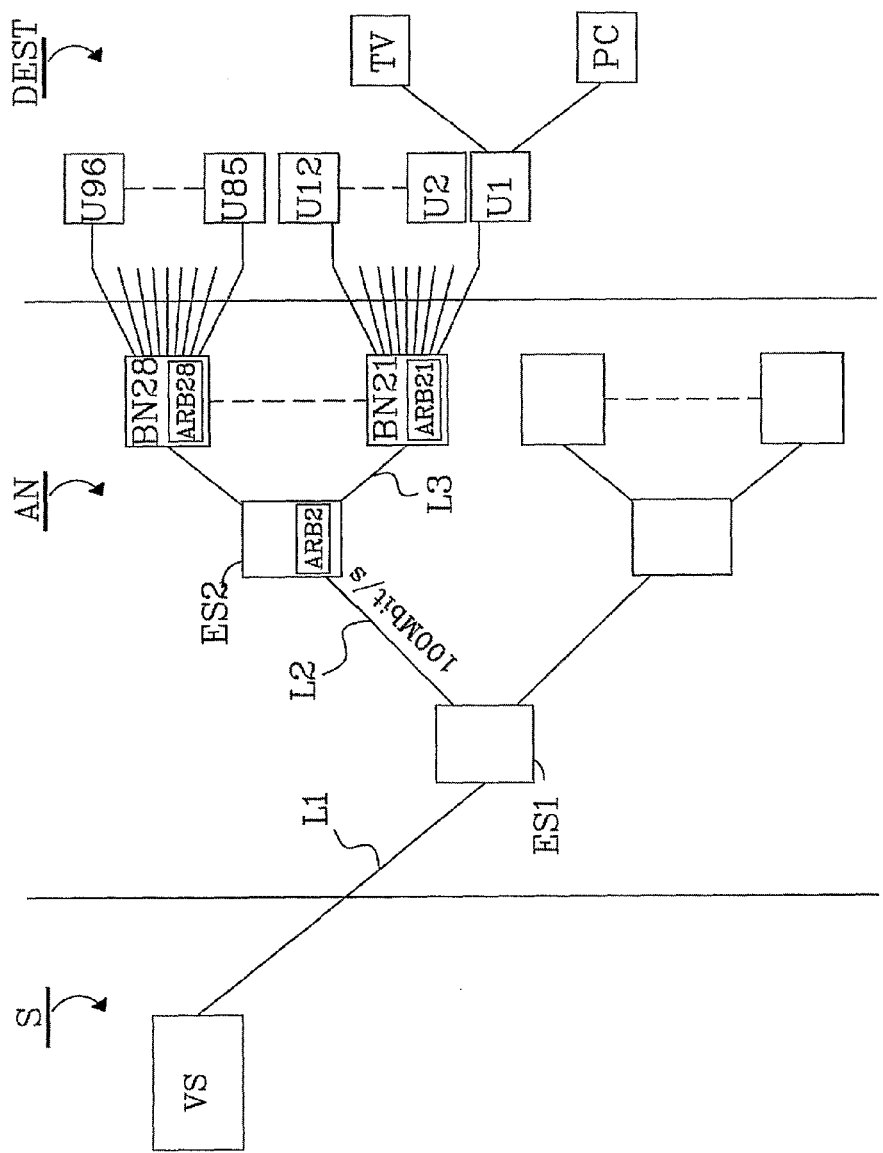
FIG. 4 shows a block schematic illustration of a multicast communication system used to transfer data from a video source via request arbiters to users at a destination.

A second embodiment is disclosed in FIG. 4. The figure shows the same multicast system as was disclosed earlier in FIG. 1. In this example not only the third link L3 is considered to be a critical link regarding conflicts. There is also a potential risk for conflicts in the second link L2. The second link is a 100 Mbit/s link and is called a common Ethernet link L2. Also the Ethernet Switch ES2 comprises in this embodiment a request arbiter ARB2. This second embodiment is a continuation of the first embodiment but it is assumed that the arbiter ARB21 did not deny the previous request from U1 due to for example that user U1 was weighted "2" in accordance with the earlier discussed scenario. When the system was configured each user associated with the Ethernet Switch was assigned a weight. U1 was, as mentioned, assigned the weight "2", U2-U12 were assigned the weights as said in the first embodiment while the users U13-U96 all were assigned the weight "1". The method according to the invention in the second embodiment comprises the following further steps:

After ARB21 has allowed the request from U1, U1's request to join the session $S_{81}$ is forwarded from the branch node BN21 to the Ethernet Switch ES2.

The arbiter ARB2 in the Ethernet Switch ES2 determines U1's actual bandwidth on the second link L2. U1 is already part of the sessions $S_1$, $S_2$ and $S_{51}$. These sessions are shared on the second link also by some of the users U13-U96. U1's actual bandwidth is hereby in this example assumed to be 1.5 Mbit/s.

The request arbiter ARB2 now determines available bandwidth on the second link L2. In this example it is assumed that a bandwidth of 3 Mbit/s is available on L2.

The arbiter determines U1's allowed bandwidth. U1's weight is "2" (15%) and U1's allowed bandwidth is consequently 0.15×3=0.45 Mbit/s.

The arbiter compares U1's actual bandwidth 1.5 Mbit/s with U1's allowed bandwidth 0.45 Mbit/s and finds that allowed bandwidth is lower than actual bandwidth.

The arbiter ARB2 denies the request from U1.

The Ethernet Switch ES2 sends a deny-message to the branch node BN21.

The request arbiter ARB21 in the branch node BN21 also denies the request from U1 and hereby frees capacity on the third link L3.

Figure 5:
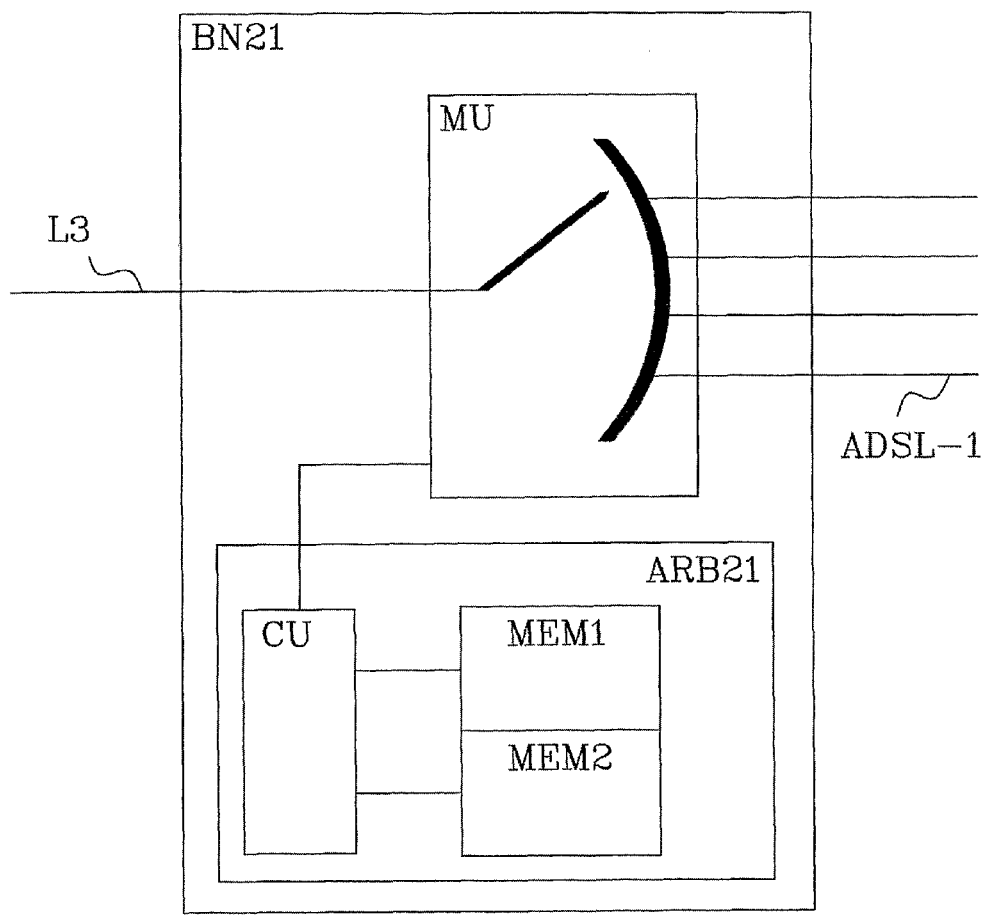
FIG. 5 discloses a block schematic illustration of a branch node.

In FIG. 5, the branch node BN21 is disclosed schematically. The node comprises a MUX-unit MU that distributes data from the third link L3 to the different ADSL links ADSL-1. The node also comprises the request arbiter ARB21 that comprises a central unit CU and two memory spaces MEM1 and MEM2. MEM1 comprises the table disclosed in FIG. 2. MEM2 comprises information about which users have recently left a requested session. The central unit CU fetches information from the third link, the ADSL links and the memory spaces. CU process the information, calculate bandwidths and times, controls the MUX-unit and distributes selected sessions from the third link L3 to the ADSL links.

Different variations are of course possible within the scope of the invention. The arrangement in FIG. 5 can for example be built up differently as long as the functions according to the invention remain. A users weight can be re-assigned at any time. Bandwidth occupied by a session may be fixed or may vary. The invention is in other words not limited to the above described and in the drawings shown embodiments but can be modified within the scope of the enclosed claims.

The invention claimed is:

1. A method for access control in a multicast system in which data is sent from a source over a common link to an arbiter node associated with a plurality of users, wherein the arbiter node distributes the data to at least two users, the method comprising the steps of:

assigning a weight to each user associated with the arbiter node, wherein the weights indicate a percentage of an available bandwidth on the common link each user is provisionally allowed to use;

receiving at the arbiter node, a request to join a new multicast session from a first user;

determining by the arbiter node, an actual bandwidth that the first user would utilize if the request to join the new multicast session is granted, wherein the actual bandwidth for the first user is calculated as the sum of the first user's bandwidth part of each currently ongoing session in which the first user is a participant plus the first user's bandwidth part of the new multicast session, wherein the first user's bandwidth part of any given session is calculated as the bandwidth required for the given session divided by the total number of users participating in the given session;

determining by the arbiter node, an allowed bandwidth for the first user, wherein the allowed bandwidth for the first user is calculated as the available bandwidth on the common link multiplied by the weight assigned to the first user;

comparing by the arbiter node, the actual bandwidth for the first user with the allowed bandwidth for the first user;

granting the request when the actual bandwidth for the first user is less than or equal to the allowed bandwidth for the first user; and denying the request when the actual bandwidth for the first user is greater than the allowed bandwidth for the first user.

2. The method according to claim 1, further comprising the steps of:

determining that the first user previously used the new multicast session within a previous predefined period of time;

temporarily increasing the weight assigned to the first user;

determining by the arbiter node, a new allowed bandwidth for the first user by multiplying the available bandwidth on the common link by the increased weight assigned to the first user; and granting or denying the request based on the new allowed bandwidth for the first user.

3. The method according to claim 2, further comprising, prior to increasing the weight assigned to the first user, the step of determining that the first user used the new multicast session for a period of time that exceeds a predetermined guarantee time.

4. The method according to claim 2, further comprising the steps of:

detecting that the first user has left the requested multicast session; and in response, reducing the weight assigned to the first user to the weight's original value.

5. An arrangement in an arbiter node for controlling access in a multicast system in which data is sent from a source over a common link to the arbiter node, wherein the arbiter node distributes the data to at least two users associated with the arbiter node, the arrangement comprising:

means for assigning a weight to each user associated with the arbiter node, wherein the weights indicate a percentage of an available bandwidth on the common link each user is provisionally allowed to use;

communication means for receiving a request to join a new multicast session from a first user;

means for determining an actual bandwidth that the first user would utilize if the request to join the new multicast session is granted, wherein the actual bandwidth for the first user is calculated as the sum of the first user's bandwidth part of each currently ongoing session in which the first user is a participant plus the first user's bandwidth part of the new multicast session, wherein the first user's bandwidth part of any given session is calculated as the bandwidth required for the given session divided by the total number of users participating in the given session;

means for determining an allowed bandwidth for the first user, wherein the allowed bandwidth for the first user is calculated as the available bandwidth on the common link multiplied by the weight assigned to the first user;

means for comparing the actual bandwidth for the first user with the allowed bandwidth for the first user;

means for granting the request when the actual bandwidth for the first user is less than or equal to the allowed bandwidth for the first user; and means for denying the request when the actual bandwidth for the first user is greater than the allowed bandwidth for the first user.

6. The arrangement according to claim 5, further comprising:
- means for determining that the first user previously used the new multicast session within a previous predefined period of time;
- means for temporarily increasing the weight assigned to the first user;
- means for determining a new allowed bandwidth for the first user by multiplying the available bandwidth on the common link by the increased weight assigned to the first user; and
- wherein the request is granted or denied based on the new allowed bandwidth for the first user.

7. The arrangement according to claim 6, wherein the means for temporarily increasing the weight assigned to the first user increases the weight only if the first user used the new multicast session for a period of time that exceeds a predetermined guarantee time.

8. The arrangement according to claim 6, further comprising:
- means for detecting that the first user has left the requested multicast session; and
- means for reducing the weight assigned to the first user to the weight's original value in response to detecting that the first user has left the requested multicast session.

* * * * *